Jan. 25, 1966 W. G. HARRISON ETAL 3,231,068
ARTICLE DELIVERY CONVEYER
Filed Jan. 7, 1963 4 Sheets-Sheet 1
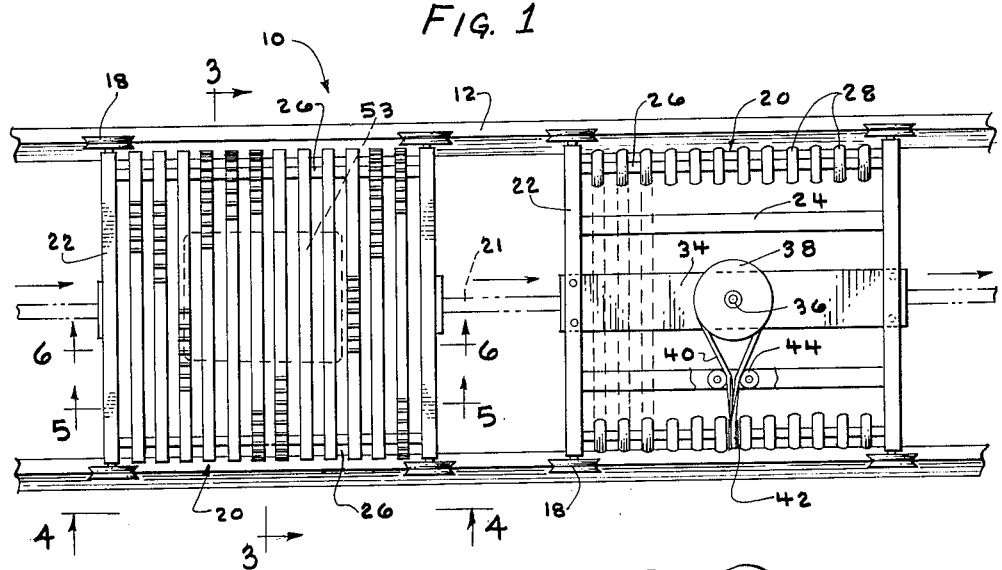
INVENTORS
WALTER G. HARRISON
LEO A. GARY
ALLAN C. AUDET
BY
Ooms, McDougall & Hersh
ATT'YS.

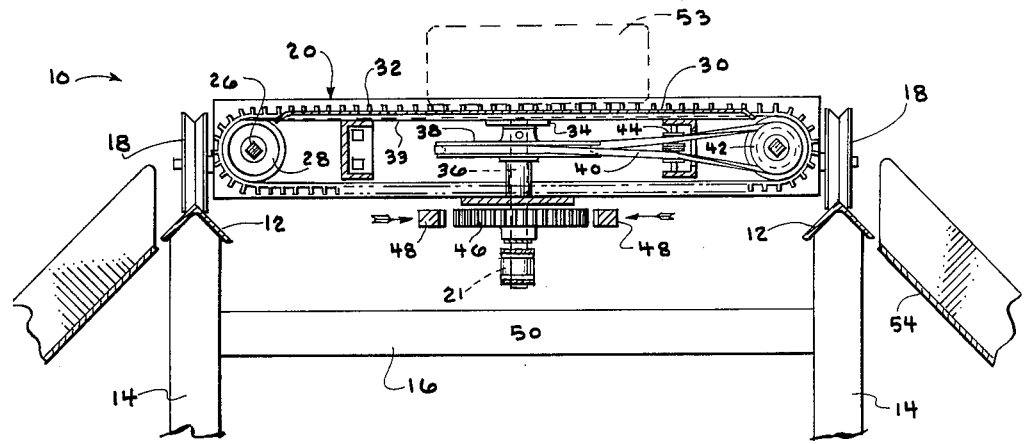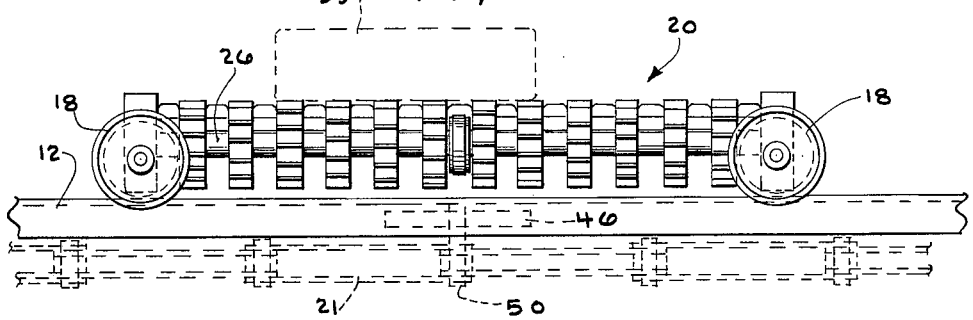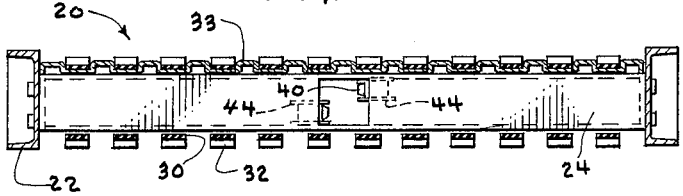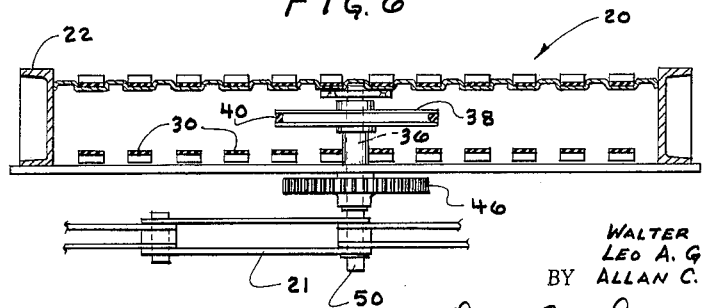

Jan. 25, 1966  W. G. HARRISON ETAL  3,231,068
ARTICLE DELIVERY CONVEYER
Filed Jan. 7, 1963  4 Sheets-Sheet 3
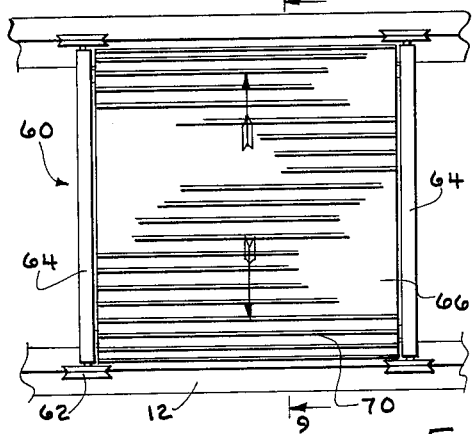
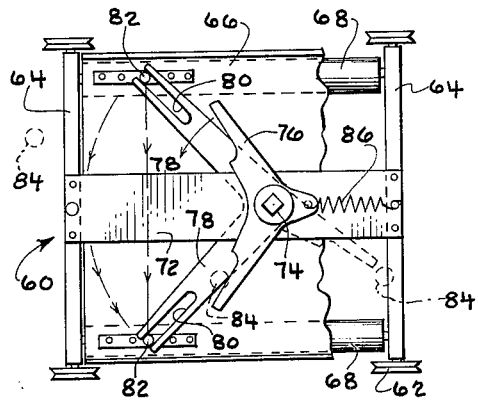
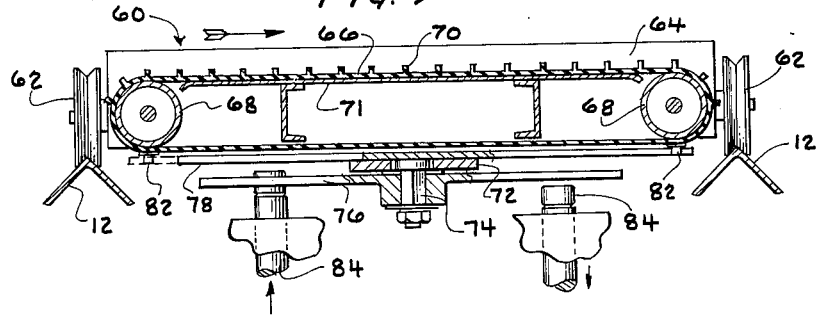
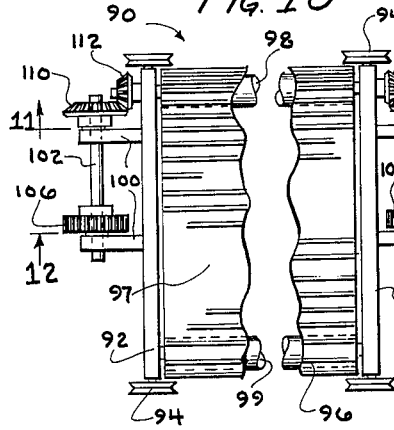
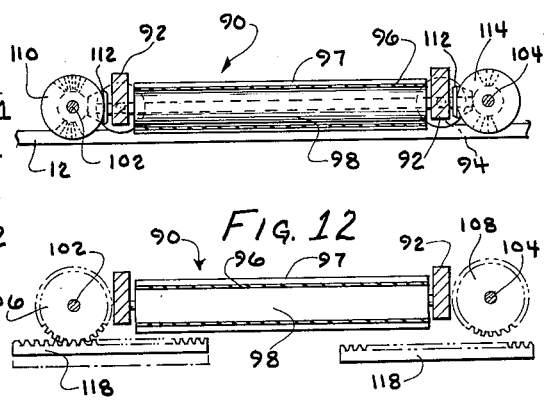
INVENTORS
WALTER G. HARRISON
LEO A. GARY
BY ALLAN C. AUDET
Ooms, McDougall & Hersh
ATT'YS.

Jan. 25, 1966 W. G. HARRISON ETAL 3,231,068
ARTICLE DELIVERY CONVEYER
Filed Jan. 7, 1963 4 Sheets-Sheet 4
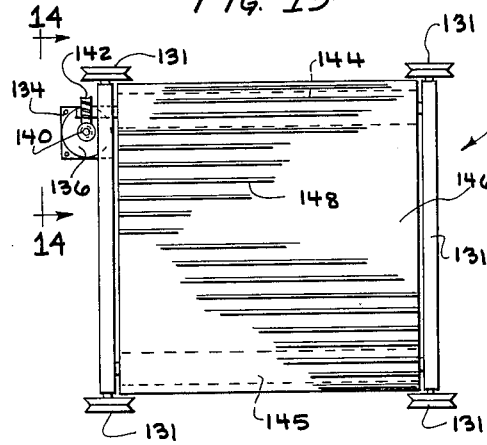
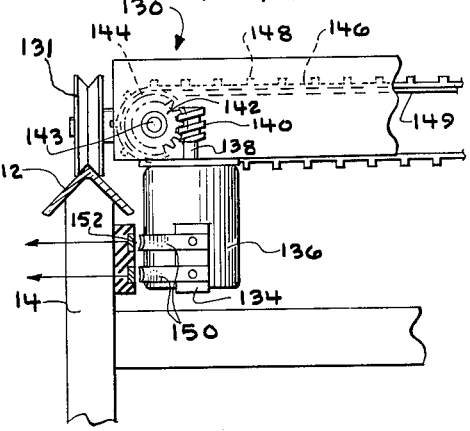
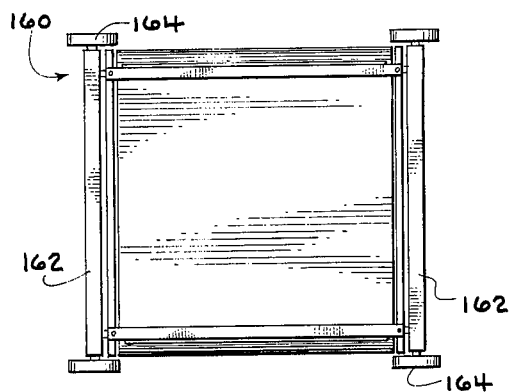
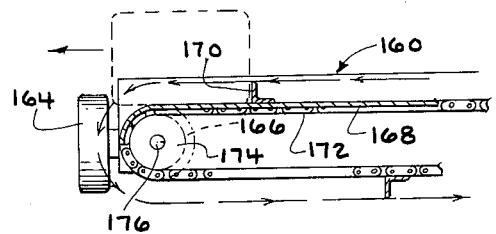
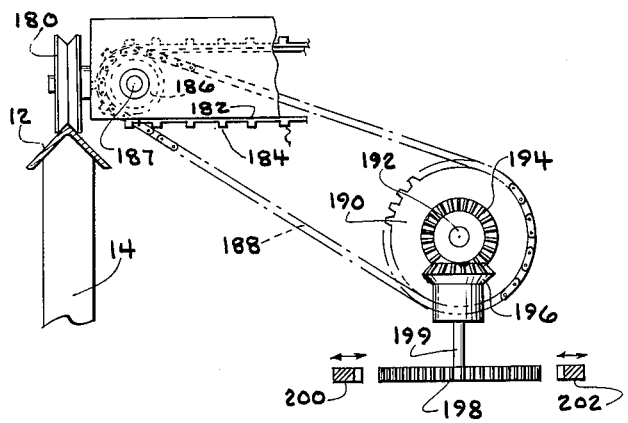
INVENTORS
WALTER G. HARRISON
LEO A. GARY
BY ALLAN C. AUDET
Ooms, McDougall & Hersh
ATT'YS.

United States Patent Office 3,231,068
Patented Jan. 25, 1966

3,231,068
ARTICLE DELIVERY CONVEYER
Walter G. Harrison, Westchester, Leo A. Gary, Chicago, and Allan C. Audet, Arlington Heights, Ill., assignors to Prospect Manufacturing Co., Inc., Chicago, Ill., a corporation of Illinois
Filed Jan. 7, 1963, Ser. No. 249,787
9 Claims. (Cl. 198—185)

This invention relates to a conveyer mechanism adapted to deliver articles in a unique manner. In particular, the mechanism of this invention is adapted to receive articles at one station and is adapted to deliver the articles at any one of several succeeding stations in an extremely efficient manner.

It is well-nown that the delivery of various articles to a plurality of stations is necessary in many large establishments. Thus, the sorting and distribution of items for subsequent handling is common practice in mechandise warehouses since the stock must be assembled prior to delivery to a packaging station. Furthermore, in post offices, it is necessary to provide means for the handling of packages, mail bags and the like whereby these items can be sorted in accordance with their respective destinations.

It is also well-known that many existing methods for sorting and distribution purposes result in extremely expensive and time consuming operations. In many instances, sorting and distribution is handled through the complete manual control of a number of individuals. Where automatic conveying devices are available, it is still necessary for operations to manually remove and sort the articles conveyed. In addition to the expense and time consuming nature of such systems, the possibility of error in the sorting operation is extreme.

In a copending application of Walter G. Harrison and John Harrison, Serial No. 81,754, filed January 10, 1961, now Patent No. 3,167,192, issued Jan. 26, 1965, and entitled Automatic Sortation System, there is described a construction which overcomes many of the difficulties experienced in the prior art. In this construction, a plurality of tiltable trays are movably positioned along a conveyer path. A plurality of stations are positioned at the sides of the conveyer path and the trays are adapted to tilt when it is desired to transfer an article on a tray to a particular station. Means are located at each of the several stations along the conveyer path which are adapted to actuate the tilting movement of the trays. A coding operation is preferably combined with the conveyer system whereby the actuating means will automatically tilt a tray when the tray moves to a desired station. The coding means is adapted to transfer a code for each article placed on each of the trays to the various actuating devices whereby the tilting of the tray will take place at the proper time.

It is an object of this invention to provide a conveyer apparatus which overcomes the difficulties experienced in the distribution and sorting of articles in that the articles can be transferred to any of several stations without manual handling.

It is a more particular object of this invention to provide an apparatus capable of achieving the foregoing object and also characterized by an extremely efficient operating mechanism as well as an ideally compact construction.

These and other objects of this invention will appear hereinafter and for purposes of illustration but not of limitation, specific embodiments of this invention are shown in the accompanying drawings in which:

FIGURE 1 is a plan view partly cut away of a section of an article handling apparatus characterized by the features of this invention;

FIGURE 2 is a plan view of a different plane of the section of the apparatus shown in FIGURE 1 and illustrating further details of the drive means utilized therewith;

FIGURE 3 is an enlarged cross-sectional view taken about the line 3—3 of FIGURE 1;

FIGURE 4 is an enlarged cross-sectional view taken about the line 4—4 of FIGURE 1;

FIGURE 5 is an enlarged cross-sectional view taken about the line 5—5 of FIGURE 1;

FIGURE 6 is an enlarged cross-sectional view taken about the line 6—6 of FIGURE 1;

FIGURE 7 is a plan view of an alternative platform design utilized in the construction of this invention;

FIGURE 8 is a bottom view of the platform shown in FIGURE 7;

FIGURE 9 is a cross-sectional view taken about the line 9—9 of FIGURE 7;

FIGURE 10 is a plan view of a still further platform design utilized in accordance with the concepts of this invention;

FIGURE 11 is a cross-sectional view taken about the line 11—11 of FIGURE 10;

FIGURE 12 is a cross-sectional view taken about the line 12—12 of FIGURE 10;

FIGURE 13 is a plan view of an additional alternative platform design utilized in accordance with this invention;

FIGURE 14 is an enlarged fragmentary view taken about the line 14—14 of FIGURE 13;

FIGURE 15 is a plan view of an additional alternative structure utilized in accordance with the concepts of this invention;

FIGURE 16 is an enlarged fragmentary view illustrating the operating principle of the platform shown in FIGURE 15; and FIGURE 17 is a fragmentary elevation illustrating a further alternative for a drive means adapted to be used in accordance with this invention.

The apparatus of this invention comprises a plurality of interconnected platforms which are adpted to receive articles for transferring of the articles to stations which are situated along the path of movement of the platforms. The improvements of this invention are specifically directed to the provision of platforms in an article handling apparatus which comprises conveyer means capable of moving whereby articles can be moved off of the platforms. Each platform includes a drive means capable of moving the conveyer associated therewith. Means are situated along the path of movement of the platforms which are adapted to actuate the drive means whereby the platform conveyer will operate to discharge an article.

The platforms designed in accordance with the concepts of this invention are particularly suitable for transferring articles to either side of the path of movement of the platforms. The structure of this invention is thus ideally suited for installations which include stations located in oppositely situated pairs along the path of movement of the platforms. The drive means are adapted to move the conveyers of the respective platforms in either direction depending on which of the stations is to receive the article situated on the platform.

The accompanying drawings illustrate various alternative structures which are capable of performing in accordance with the concepts of this invention. FIGURES 1 through 6 illustrate a conveyer construction 10 which comprises longitudinal frame members 12 and upright frame members 14. Cross supports 16 are provided between the uprights 14 and the longitudinal members 12 comprise an inverted V member to provide a track for supporting a plurality of article carrying means.

The wheels 18 of platforms 20 are adapted to ride on the tracks 12 to provide for handling of articles by the apparatus. An endless chain or other suitable means 21 can be utilized to interconnect the platforms whereby they will move as a unit along the tracks 12.

The platform constructions shown comprise horizontal frame members 22 which provide journals for the wheels 18. The platform also includes longitudinal frame members 24 extending between the members 22, and rods 26 journaled in the members 22 are disposed parallel to the frame members 24. The rods 26 carry belt supporting discs 28 and a plurality of endless belts 30 are carried by these discs. Cleats 32 are formed on the outer side of the belts 30 to provide a good gripping surface for articles carried by these belts. A tray construction 33 extends between the frame member 22 to provide a support for the upper flight of the belts 30. This tray construction also decreases the possibility of small articles dropping between the belts 30.

Also extending between the frame members 22 is a plate 34. The upper end of a shaft 36 is adapted to rotate with respect to this plate. A pulley 38 is keyed to the shaft 36 and a belt 40 is operatively connected to this pulley. The belt 40 extends to a second pulley 42 which is keyed to the rotary rod 26. The belt 40 passes in engagement with guide wheels 44 and these wheels aid in changing the pulley movement from a horizontal to a vertical plane during the course of its movement between the pulleys 38 and 42.

A pinion 46 is also keyed to the shaft 36 and a pair of racks 48 are reciprocally mounted in the same plane as the pinion 46. An extension 50 of the shaft 36 provides a means for connecting the drive chain 21.

In the use of the platform construction illustrated in FIGURES 1 through 6, it is desired to transfer an article such as the article 53 to chutes 54 or other means stationed along the path of movement of the platforms. To effect a transferring action by the platform structure, one of the racks 48 is moved into position to engage a pinion 46. When one of the racks engages the pinion, for example as shown in FIGURE 2, rotary movement will be imparted to the shaft 36. This movement in turn will result in rotation of the pulley 38 and in rotation of the discs 28 through the belt 40 and pulley 42. Accordingly, the conveyer belts 30 will be moved in a direction perpendicular to the direction of movement of the platforms whereby an article can be transferred to one of the chutes 54. It will be appreciated that the length of the racks 48 will determine the extent of movement of the belts 30 whereby any article can be removed from the platform 20 in the manner described. It will also be appreciated that engagement of the pinion by an opposite rack will result in movement of the belts 30 in the opposite direction wherby an article carried thereon can be transferred to an oppositely situated chute.

FIGURES 7, 8 and 9 illustrate an alternative platform structure 60 which is provided with wheels 62 whereby the platform can ride on the tracks 12. The wheels 62 are journaled in horizontal frame members 64 of the platform.

An endless web 66 extends around a pair of rolls 68 which are situated to extend perpendicular to the frame members 64. The web 66 is provided with laterally extending ribs 70 across one-half of its surface to thereby improve the gripping action of the web. The opposite side of the web is supported by means of a plate 71 whereby sagging of the web can be avoided.

A mounting plate 72 is fixed between the frame members 64 and a shaft 74 is journaled in this plate. A lever means 76 is tied to this shaft and a pair of arms 78 are also tied to the shaft whereby movement of the shaft will result in a swinging action in these arms. The arms 78 define slots 80 which are adapted to receive pins 82 fastened to the underside of the plate 71.

A pair of reciprocally mounted actuating pins 84 are located in the path of movement of the platform 60. Upon raising of one of these pins 84, one of the sides of the lever 76 will engage the raised pin and the lever will therefore swing around as the platform movement continues. This movement of the lever 76 will be transmitted to the arms 78 and these arms will in turn provide for movement of the web 66 through engagement of the pins 82 fastened to the web.

The movement of the web 82 will effect discharge of an article located on the top surface of the web. The engagement of the lever 76 with a pin 84 will terminate when the platform moves the lever beyond the pin 84. A restoring spring 86 is connected to this lever whereby the lever will return to the normal position shown when disengaged by a pin 84 and the web 66 will also be returned through action of the arms 78 and pins 82. It will be appreciated that the web 66 can be moved in either direction depending on which of the pins 84 is actuated.

FIGURES 10 through 12 illustrate a platform 90 which comprises an additional alternative form of the invention. The platform includes horizontal frame members 92 which provide means for journaling the wheels 94 whereby the platform is adapted to ride on the track 12. An endless web 96 having a plurality of transverse ribs 97 on its outer surface extends around rolls 98 and 99 which are also journaled in the frame members 92.

Secured beneath the frame members 92 are a pair of rods 100 which provide journals for shafts 102 and 104. Spur gears 106 and 108 are fastened on the shafts 102 and 104 respectively and bevel gears 110 and 112 are operatively connected to the spur gear 106 through shaft 102 while bevel gears 114 and 116 are operatively connected to the spur gear 108 through shaft 104.

Racks 118 are situated between the tracks 112 and are adapted to engage the spur gears 106 or 108 when they are raised upwardly by actuating means (not shown). When a rack 118 is raised upwardly to engage spur gear 108, the bevel gears 114 and 116 will operate through a connection with roll 98 to move the web 96 in one direction. On the other hand, when a rack 118 is engaged with the spur gear 106, the bevel gears 110 and 112 will operate to move the web 96 in the opposite direction. It will be appreciated that the movement of the racks 118 must be timed in accordance with the speed of movement of the platforms 90 so as to provide for engagement with the desired spur gear.

In FIGURES 13 and 14, there is illustrated a platform construction 130 which comprises a still further alternative form of the invention. The platform includes horizontal frame members 131 which provide journals for the wheels 132 whereby the platform can be transported over tracks 12 situated on upright supports 14.

The platform 130 carries a bracket 134 upon which is mounted a motor 136. The motor drive shaft 138 is connected to a worm 140 which is associated with gear 142. This gear is keyed to the shaft 143 which also carries roller 144. An endless web 146 is supported by this roller and a similar roller 145 situated at the opposite end of the platform. Ribs 148 are provided on the outer surface of the web and a plate 149 serves to support the upper flight of this web.

The motor 136 carries wipers 150 which are adapted to move to engage contacts 152 which are secured to the stationary upright 14. The contacts 152 are connected to a reversing switch (not shown).

In the operation of a system employing the platforms 130, it will be appreciated that the wipers 150 will engage the contacts 152 each time such contacts are encountered. It is preferred to provide these contacts adjacent oppositely situated discharge stations whereby articles carried by the platforms 130 can be delivered in a desired manner. The operation of the switch for the individual stations of contacts will determine the discharge function of the platforms. When the switch for a given set of contacts is open, the motor 136 will remain inoperative when these contacts are engaged with the wipers 150 for that motor. When the switch is closed, the motor 136 will operate through the worm 140 to move the web 146. By reversing the polarity across the motor 136, the same contacts can be utilized for moving the web 146 in the opposite direction. It will be appreciated that an arrangement must be provided whereby operation of the motor will be effective to move an article sufficiently to discharge it from the web. A high speed motor is preferably employed to effect the desired degree of movement. The contacts 152 can also be of an extended length to thereby provide the necessary duration of operation of the motor 136.

A still further alternative is illustrated in FIGURES 15 and 16. The platform 160 shown therein includes horizontal frame members 162 and associated wheels 164. Rolls 166 journaled in the frame 162 are provided for supporting the web 168. A pair of bars 170 are formed at either end of the web 168 and these bars are adapted to engage articles disposed on the web.

A chain 172 engages sprockets 174 which are keyed to the rolls 166. Any suitable drive means including drive means of the type described above can be employed for imparting rotary movement to the sprockets 174 whereby the web 168 will move sufficiently to discharge an article disposed thereon. The use of bars 170 in place of ribs or cleats on the web provides a satisfactory alternative for insuring movement of a package to either extreme end of the platform conveyor. The additional alternative shown in FIGURE 17 comprises a platform employing wheels 180 whereby the platform can be carried over the track 12 situated on upright supports 14. An endless web 182 having transverse ribs 184 is carried by the platform. A sprocket 186 is keyed to a shaft 187 in a manner such that rotation of the sprocket will result in movement of the web 182.

A chain 188 connects the sprocket 186 with sprocket 190. This sprocket is mounted on shaft 192 and a bevel gear 194 is also tied to this shaft. The bevel gear 194 engages bevel gear 196 which is operatively connected to pinion 198 through shaft 199. A pair of racks 200 and 204 are located on either side of the pinion 198.

The racks 200 and 202 are adapted to be moved inwardly to engage pinion 198 and to thereby provide for movement of the web 182 in either direction. The means for moving the racks 200 and 202 and the means for moving the various other actuating means referred to above are preferably interconnected with a coding arrangement. Specifically, it is desired to provide an arrangement whereby articles can be coded when they are first placed on one of the platforms of the apparatus. When the platform has moved to a position opposite the station where the article is to be discharged, the actuating means for that particular platform will be automatically energized to effect the desired discharged.

Various well-known mechanisms may be employed for providing the desired operation of the actuating means for the individual platforms in an automatic fashion. One alternative is described in the aforementioned copending application Serial No. 81,754, now Patent No. 3,167,192. It will be appreciated, however, that the actuating means of this invention can be operated in a large variety of ways and that the inventive features of the conveyer platform constructions can be adopted in a large variety of installations.

The platform constructions described are particularly advantageous since they can be operated by means of a wide variety of relatively uncomplicated drive mechanisms. A further important characteristic of the platform constructions resides in the fact that the constructions are relatively compact in nature and therefore a great amount of space is not required for the installation of these constructions. The platforms and the operating means therefore operate virtually at all times in the same plane and therefore provision for extensive vertical movement by the constructions is not necessary. Furthermore, the platform constructions themselves do not require the use of mechanisms which extend outwardly from the path of movement thereof.

It will be appreciated that various changes and modifications can be made in the article handling apparatus described which provide the characteristics of this invention without departing from the spirit thereof particularly as defined in the following claims.

That which is claimed is:

1. In an article handling apparatus which includes substantially horizontally disposed track means, a plurality of interconnected article carrying platforms each having wheels riding on said track means, means for moving said platforms along said tracks and article receiving stations located on opposite sides of said tracks adapted to receive articles disposed on said platforms, the improvement wherein said platforms each include a conveyor means defining a movable article carrying upper surface, said surface being retained in a horizontal plane during discharge of said articles, drive means attached at the underside of each platform for movement therewith and being operatively connected to an associated conveyor means for moving the conveyor means laterally of said track means in either of two directions toward one of said receiving stations, and actuating means associated with each of said receiving stations and located on opposite sides of the path of movement of said drive means for selectively initiating operation of said drive means depending on which of the stations is to receive said articles, said actuating means comprising means adapted to be selectively moved into mechanical engagement with said drive means, and wherein said actuating means operate to impart driving movement to said drive means.

2. An apparatus in accordance with claim 1 wherein said conveyer means comprise endless webs having a plurality of laterally disposed ribs on their article engaging surfaces.

3. An apparatus in accordance with claim 1 wherein said conveyer means comprise endless webs having sweper bars secured on their article engaging surfaces.

4. An apparatus in accordance with claim 1 wherein said conveyer means comprise a plurality of endless belts, each belt having a plurality of cleat means on its article engaging surface.

5. In an article handling apparatus which includes a plurality of article carrying platforms, means for moving said platforms along a predetermined path, and article receiving stations located in oppositely situated pairs along said path adapted to receive articles disposed on said platforms, the improvement wherein said platforms each comprise a generally rectangular frame, conveyor supporting means rotatably mounted at the sides of said frame about axes substantially parallel to the direction of said path, endless conveyor means situated on said supporting means, drive means associated with each of said platforms and operatively connected to said supporting means, said drive means being adapted to move said conveyors in two directions perpendicular to said axes, and actuating means associated with each of said receiving stations for selectively initiating operation of said drive means, said drive means including a gear and said actuating means comprising rack means extending longitudinally of said path and situated on opposite sides of the path of movement of said gear, said rack means being normally maintained in a position such that the rack means will not engage said gear as an associated platform moves past said rack means, and means for selectively moving said rack means toward and away from a position which will bring the rack means into engagement with said gear whereby said gear can be selectively rotated in either direction for discharge of articles from either side of a platform depending on which of the rack means is moved to an engaging position.

6. In an article handling apparatus which includes a plurality of article carrying platforms, means for moving said platforms along a predetermined path, and article receiving stations located in oppositely situated pairs along said path adapted to receive articles disposed on said platforms, the improvement wherein said platforms each comprise a generally rectangular frame, conveyor supporting means rotatably mounted at the sides of said frame about axes substantially parallel to the direction of said path, endless conveyor means situated on said supporting means, drive means associated with each of said platforms and operatively connected to said supporting means, said drive means being adapted to move said conveyors in two directions perpendicular to said axes, and actuating means associated with each of said receiving stations for selectively initiating operation of said drive means, said drive means including a lever means and arms contacting said conveyor means, said arms being operatively connected to said lever means whereby movement of said lever means will result in movement of said conveyor means due to said contact with said arms, said actuating means comprising pin means situated adjacent the path of movement of said platform, and means for moving said pin means to an actuating position as said platform passes through a station, said pin means engaging said lever means when in said actuating position to thereby cause movement of said lever means and associated arm means to effect discharge movement of said conveyor means.

7. An apparatus in accordance with claim 1 wherein said drive means include a gear and said actuating means comprise rack means extending longitudinally of said path and situated on opposite sides of the path of movement of said gear, said rack means being normally maintained in a position such that the rack means will not engage said gear as an associated platform moves past said rack means, and means for selectively moving said rack means toward and away from a position which will bring the rack means into engagement with said gear whereby said gear can be selectively rotated in either direction for discharge of articles from either side of a platform depending on which of the rack means is moved to an engaging position.

8. An apparatus in accordance with claim 1 wherein said drive means includes a lever means and arms contacting said conveyor means, said arms being operatively connected to said lever means whereby movement of said lever means will result in movement of said conveyor means due to said contact with said arms, said actuating means comprising pin means situated adjacent the path of movement of said platform, and means for moving said pin means to an actuating position as said platform passes through a station, said pin means engaging said lever means when in said actuating position to thereby cause movement of said lever means and associated arm means to effect discharge movement of said conveyor means.

9. In an article handling apparatus which includes a plurality of article carrying platforms, means for moving said platforms along a predetermined path, and article receiving stations located in oppositely situated pairs along said path adapted to receive articles disposed on said platforms, the improvement wherein said platforms each comprise a generally rectangular frame, conveyor supporting means rotatably mounted at the sides of said frame about axes substantially parallel to the direction of said path, endless conveyor means situated on said supporting means, drive means associated with each of said platforms and operatively connected to said supporting means, said drive means being adapted to move said conveyors in two directions perpendicular to said axes, and actuating means associated with each of said receiving stations for selectively initiating operation of said drive means, said drive means comprising a reversible electric motor operatively connected to said supporting means and said actuating means comprising contact means situated at each of said stations to supply current to said motors as the respective platforms pass said article receiving stations, means for supplying current to said contacts, means for cutting off said current supply and means for reversing the polarity of said contacts.

References Cited by the Examiner

UNITED STATES PATENTS

| 598,192 | 2/1898 | Alkire | 198—190 |
| 2,656,940 | 10/1953 | Sumners et al. | 198—37 X |
| 3,034,665 | 5/1962 | Speaker | 198—181 X |

FOREIGN PATENTS

| 1,098,912 | 3/1955 | France. |

SAMUEL F. COLEMAN, Primary Examiner.

WILLIAM B. LA BORDE, Examiner.